Patented Nov. 11, 1941

2,262,737

UNITED STATES PATENT OFFICE 2,262,737

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, Mo., assignor to Petrolite Corporation, Ltd., Wilmington, Del., a corporation of Delaware No Drawing. Application October 11, 1940, Serial No. 360,800

13 Claims. (Cl. 166—21)

This invention relates to the art or procedure commonly referred to as acidization of oil-bearing calcareous strata or the like, and which consists in introducing a strong mineral acid into an oil well for the purpose of causing the acid to disintegrate, dissolve, or react with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical, or similar treatment, in order to recover the oil or valuable constituent of the emulsion. My invention has for its main object to prevent the formation of objectionable water-in-oil type emulsions resulting from acidization of oil wells; or stated in another way, one object of my invention is to provide a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory, rather than a permanent situation; but even if lasting only for a few weeks, they are extremely objectionable.

Another object of my invention is to provide a new composition of matter that is particularly adapted for use in the operation of acidizing the calcareous structure in a way to increase the amount of crude petroleum obtainable from said structure, without, however, converting said crude petroleum into an objectionable emulsion.

My new process, briefly stated, consists in causing an emulsion-preventing agent of the kind hereinafter described, to be mixed with, dissolved in, or commingled with the fluids, liquids, or liquid mixture in an oil well that has been subjected to or which is being subjected to acidization, prior to emergence of said fluids, liquids, or liquid mixtures from the well. Said emulsion-preventing agent consists of a chemical compound or condensation product obtained by mixing together at least one mole of alkylolamine with one mole of higher organic carboxylic acid and at least one mole of a non-hydroxylated amine, and heating the mixture at a temperature of about 100° C. or higher, but below the temperature of decomposition of the resulting hydrotropic material, to effect a condensation between the alkylolamine, higher organic carboxylic acid and non-hydroxylated amine. Such compounds, together with a method for manufacturing the same, are disclosed in U. S. Patent No. 2,094,609, dated October 5, 1937, to Kritchevsky. The maximum condensation temperature mentioned is 300° C. The composition of the condensation products described in the said Kritchevsky patent is unknown. For this reason many of the properties of the materials are unpredictable. It is surprising to find that such materials are stable for an extended period of time in half-concentrated hydrochloric acid or other similar mineral acids. It is likewise remarkable to note that such solutions in acid, and particularly in relatively low ratios, as hereinafter described, give a very pronounced lowering of the surface tension. This is especially true in such compounds, or condensation products that are derived at relatively high temperatures, and especially if derived from polyamino reactants. This is all the more remarkable, in view of the relatively weak stability of esters and amides toward strong acids. It is difficult to indicate a probable structure for such compounds which would account for their resistance to decomposition in strong acid solution.

In practising my process, the emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground. But the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent along with the mineral acid, i. e., dissolved in said acid; and (c) Introducing the emulsion-preventing agent, preferably in aqueous solution, immediately after the introduction of the mineral acid.

The composition of matter that I have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. My preference is to use hydrochloric acid whose concentration is at least equal to approximately half strength commercial 18 Bé. acid, as I have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, I wish it to be understood that my invention, i. e., the process and composition of matter herein described, is not restricted to the use of hydrochloric acid, but instead, contemplates the use of any suitable strong mineral acid, several of which have previously been described as being usable in place of hydrochloric acid. Similarly, I wish it to be understood that the new composition of matter herein described may have other or additional uses, such, for example, as in the acidization of oil-bearing strata which do not produce emulsions. The hydrochloric acid or the like that is employed, may or may not have present other addition agents intended to make the acid particularly adapted to most localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of same, with siliceous material, or material which is dolomitic in character, and commonly referred to as calcareous structures. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art related to acidization, although there are in addition certain other practical elements which are well known: U. S. Patent Nos. 1,877,504, dated Sept. 13, 1932, Grebe and Sanford; 1,891,667, dated Dec. 20, 1932, Carr; 1,911,446, dated May 20, 1933, Grebe and Sanford; 1,990,969, dated Feb. 12, 1935, Wilson; 2,011,579, dated Aug. 20, 1935, Heath and Fry; 2,024,718, dated Dec. 17, 1935, Chamberlain; 2,038,956, dated Apr. 28, 1936, Parkhurst; 2,053,285, dated Sept. 8, 1936, Grebe; 2,128,160, and 2,128,161, dated Aug. 23, 1938, Morgan, and 2,161,085, dated June 6, 1939, Phalen.

As has been previously stated, in the acidization of oil-bearing calcareous strata or the like, it has been found necessary in some instances, to add certain other materials or compounds which give additional desirable effects, at least under certain conditions. For instance, hydrofluoric acid or fluorides, have been added to intensify the action of the hydrochloric acid used to treat the well. Possibly this is related to the action on siliceous matter in the calcareous structure. The reason for the addition of inhibitors has been previously indicated. Sometimes it has been desirable to add tenacious foam-producing agents, such as glue, gelatin, or the like. In other instances, it has been desirable to add calcium sequestering compounds, such as sodium hexametaphosphate. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

I have found that the materials or products which I contemplate adding to the hydrochloric acid or the like to produce my new composition of matter, or to act as an emulsion-preventing agent in my new process, do not interfere in any manner with the functional effect of other conventional acidizing addition agents. Of course, any single example may contain no additional agent at all; it may contain one or more, depending upon the particular local conditions and use. As far as I am aware, the herein-contemplated compounds which are added to hydrochloric acid, or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength or somewhat weaker, is usually diluted with an equal quantity of water before it is used for acidization, i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit: 0.01% and 2.5%. In many instances, the use of between 0.05% and 0.5% represents an acceptable average range.

In actual practice the hydrochloric acid obtained by a person or firm responsible for acidizing operations, may be used, in some instances, on oil-bearing strata, which do not form severe or refractory emulsions, and thus no advantage is obtained by adding a composition of the kind herein contemplated, in comparison with ordinary acid. Then too, some calcareous oil-bearing strata which produces severe emulsions, may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-preventing agent that I employ, and without danger of said emulsion-preventing agent interfering with the effectiveness of such other acidization addition products. Likewise, it has been indicated that one need not necessarily employ my emulsion-preventing agent in the form of an addition agent, which is added to or mixed with the acid used in the acidizing step. Instead, my emulsion-preventing agent may be introduced in suitable aqueous solution, preferably in fairly concentrated solution, for instance, 1-5%, prior to the acidizing step, or immediately after the acidizing step. The method of introduction is, of course, any conventional method, and preferably, employs the same apparatus and procedure used for introducing the acid. For convenience, however, and in the most preferred form, my invention is exemplified by employing as an integral part thereof the composition of matter herein contemplated, to wit, hydrochloric acid or the like, containing in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing roughly the equivalent of 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of the new composition of matter herein described, make it adaptable for use in other arts with which I am not acquainted; but it may be apparent to others. It is also possible that the stable mixture of the kind described, i. e., certain agents dissolved in strong mineral acid, have other properties which I have not investigated, and in view of such properties, such mixture is particularly adaptable for the particular use herein described.

As has been stated, materials of the kind described in said aforementioned Kritchevsky patent are obtained from higher molecular weight carboxy acids, and particularly, monocarboxy acids, or their functional equivalents, such as the acyl halide, ester, amide, etc. The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, such as abietic acid, naturally-occurring petroleum acids, such as naphthenic acids, and carboxy acids produced by the oxidation of petroleum. As will be substantially indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebasic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetyl-ricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils, such as those mentioned; hydroxy and alphahydroxy higher carboxylic aliphatic and fatty acids, such as dihydroxystearic acid, dihydroxy palmitic acid, dihydroxybehenic acid, alphahydroxy capric acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroabietic acid; aralkyl and aromatic acids, such as benzoic acid, Twitchell fatty acids, naphthoic acid, carboxydiphenyl pyridine carboxylic acid, hydroxybenzoic acid, and the like.

Other suitable acids include phenylstearic acid, benzoylnonylic acid, cetyloxyacetic acid, chlorstearic acid, fencholic acid, cetyloxybutyric acid, etc. The condensation products employed are manufactured in the manner described in said aforementioned Kritchevsky patent. The temperature preferably employed is just short of 250° C. The amines which may be employed include the various amines enumerated in said Kritchevsky patent along with others of a similar nature. This is also true in regard to the hydroxylated amines.

I have found, however, that particularly effective condensation products are obtained if one employs an unsaturated fatty acid or a compound thereof along with at least one polyamino reactant. This is especially true provided that the hydroxylated amine contains at least two hydroxyl radicals. Furthermore, the non-hydroxyl amine should contain a primary or secondary amino group. It is most desirable that these particular condensation products be free from aryl radicals, and that they be obtained at the higher temperatures indicated, about 240–250° C. It is most advantageous to prepare this type of condensation product from the naturally-occurring glycerides, or if prepared from the fatty acids, it is desirable to add at least one mole of glycerol to the mixture for each mole of fatty acid employed. In order to illustrate the manufacture of such condensation products, attention is directed to the following examples:

Example 1

A mixture is prepared using a pound mole each of the following: Teaseed-oil fatty acid, triethanolamine and cyclohexylamine. Such mixture is maintained for 3–4 hours at 235–250° C.

Example 2

Benzylamine is substituted for cyclohexylamine in Example 1.

Example 3

Amylamine is substituted for cyclohexylamine in Example 1.

Example 4

Diethylene triamine is substituted for cyclohexylamine in Example 1.

Example 5

Tetraethylene pentamine is substituted for cyclohexylamine in Example 1.

Example 6

Triethylene tetramine is substituted for cyclohexylamine in Example 1.

Example 7

Triisopropanol is substituted for triethanolamine in Examples 1 through 6.

Example 8

Diethanolamine is substituted for triethanolamine in Examples 1–6, inclusive.

Example 9

Tris (hydroxymethyl) aminomethane is substituted for triethanolamine in Examples 1–6, inclusive.

Example 10

Glycerolamine is substituted for triethanolamine in Examples 1–6, inclusive.

Example 11

Hydroxyethyl ethylenediamine is substituted for triethanolamine in Examples 1–6, inclusive.

Example 12

Tetra (hydroxyethyl) tetraethylene pentamine is substituted for triethanolamine in Examples 1–6, inclusive.

Example 13

Tetra (hydroxyethyl) triethylene tetramine is substituted for triethanolamine in Examples 1–6, inclusive.

Example 14

Di (hydroxyethyl) diethylenetriamine is substituted for triethanolamine in Examples 1–6, inclusive.

Example 15

Other unsaturated fatty acids, such as ricinoleic acid, soyabean fatty acids, corn oil fatty acids, and the like are substituted for teaseed oil acids in Examples 1–14, inclusive.

Example 16

A saturated fatty acid, or mixture thereof, such as cocoanut oil fatty acids is used in place of teaseed oil fatty acid in Examples 1–14, inclusive.

Example 17

Naphthenic acids are employed in place of teaseed oil fatty acid in Examples 1–14, inclusive.

Example 18

The glycerides are used in place of the fatty acids in Examples 1–16, inclusive, employing one pound mole of glycerides for three pound moles of amine and three pound moles of hydroxylated amine.

Example 19

The fatty acids are employed as in Examples 1–16, inclusive, but glycerol is added to the mixture prior to heating. One pound mole of glycerol is used for each three pound moles of fatty acid.

Example 20

The amount of glycerol in the prior example is doubled.

Example 21

Diglycerol is substituted for glycerol in Examples 19 and 20.

Example 22

In preceding examples the molecular proportions of hydroxylated amine is doubled.

Example 23

In Examples 1–22, inclusive, the molar proportions of hydroxylated amine is tripled.

Example 24

Examples 1–23, inclusive, are repeated, using temperatures approximating the maximum mentioned in the Kritchevsky patent, i. e., 300° C. The expression "pound mole" is used in the conventional sense to mean the weight in pounds numerically equal to the molecular weight.

It is to be emphasized that one may use any suitable detergent-forming acid, including rosin acids; and, for that matter, one may employ a high molal carboxy acid which is not of the detergent-forming type. Although polyhydroxylated amines are preferred, yet one may employ a monohydroxylated type, such as monoethanolamine, cyclo-hexylethanolamine, etc. Similarly, although primary or secondary amines are most desirable, one may employ a tertiary amine, such as triamylamine, pyridine, etc. One may employ arylamines and hydroxylated arylamines. However, the type of condensation products exemplified by the preferred class previously described is so much more effective than the other members of the broad genus, that for practical purposes they may be considered as an invention within an invention.

For purposes of clarity and ease of comparison, I have used the expressions "condensation product," "amine," "condensing," in the same sense as employed in the aforementioned Kritchevsky patent. The expression "hydroxylated amine" is employed in its conventional sense to mean an alkylolamine or a hydroxylated alicyclic amine, or the like.

All the chemical compounds previously described are water-soluble as such, or when dissolved in dilute acid or acid of the concentration indicated. Such compounds may be combined not only with mineral acids, but also with organic acids, such as acetic acid, lactic, stearic acid, or the like. For this reason they can be used without difficulty in aqueous solution as an emulsion-prevention agent by injecting such aqueous solution into the oil-bearing strata prior to acidization, or immediately after acidization. Such injection is made by conventional means, as for example, the same apparatus or mechanical device employed for injecting acid into the well or oil-bearing strata. Furthermore, substantially all the compounds above described are soluble in hydrochloric acid of a strength corresponding to approximately 15%. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22° Bé., corresponding to approximately 35.2% anhydrous acid. Some commercial hydrochloric acid is available in a strength which approximates the C. P. grade or slightly less than 37% anhydrous acid.

Needless to say, my new composition of matter can be prepared readily in any convenient form. The expression "new composition of matter" in this present instance is intended to refer to the combination or mixture obtained by combining materials described in said aforementioned Kritchevsky patent with hydrochloric acid or the like, as has been described.

The selected compound may be dissolved in concentrated hydrochloric acid without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to add the particular chemical compound which has been selected as the emulsion-preventing agent. The percentage of chemical compound of the kind herein described is added within the range of 0.01% to 5%.

In the hereto appended claims, reference to the use of the condensation product is intended to include the base form, i. e., the chemical combination of water, and also the salt form, such as the lactate, acetate, citrate, or the like.

Having thus described my invention, what I claim as new and desire to secure by Letters Patent is:

1. A process for preventing water-in-oil emulsions resulting from the acidization of calcareous oil-bearing strata, which consists in introducing into the cognate fluids of a well prior to emergence, the condensation product derived from one mole of a higher molecular weight carboxy acid, at least one mole of an alkylolamine, and at least one mole of an amine.

2. A process for preventing water-in-oil emulsions resulting from the acidization of calcareous oil-bearing strata, which consists in introducing into the cognate fluids of a well prior to emergence, the condensation product obtained by reacting one mole of a higher molecular weight carboxy acid with at least one mole of an alkylolamine and at least one mole of an amine at a temperature between 100° and 300° C.

3. A process for preventing water-in-oil emulsions resulting from the acidization of calcareous oil-bearing strata, which consists in introducing into the cognate fluids of a well prior to emergence, the condensation product obtained by reacting one mole of a fatty acid having at least 8 carbon atoms and not more than 32 carbon atoms, with at least one mole of an alkylolamine and at least one mole of an amine at a temperature between 100° and 300° C.

4. A process for preventing water-in-oil emulsions resulting from the acidization of calcareous oil-bearing strata, which consists in introducing into the cognate fluids of a well prior to emergence, the condensation product obtained by reacting one mole of an unsaturated fatty acid having at least 8 carbon atoms and not more than 32 carbon atoms, with at least one mole of an alkylolamine and at least one mole of an amine at a temperature between 100° and 300° C.

5. A process for preventing water-in-oil emulsions resulting from the acidization of calcareous oil-bearing strata, which consists in introducing into the cognate fluids of a well prior to emergence, the condensation product obtained by reacting one mole of ricinoleic acid with at least one mole of an alkylolamine and at least one mole of an amine at a temperature between 100° and 300° C.

6. A process for preventing water-in-oil emulsions resulting from the acidization of calcareous oil-bearing strata, which consists in introducing into the cognate fluids of a well prior to emergence, the condensation product obtained by reacting one mole of ricinoleic acid with at least one mole of an ethanolamine and at least one mole of an amine at a temperature between 100° and 300° C.

7. A new composition of matter, comprising a strong mineral acid and the condensation product derived from one mole of a higher molecular weight carboxy acid, at least one mole of an alkylolamine, and at least one mole of an amine, said mineral acid in uncombined form being present on a large molal excess basis in comparison with the condensation product.

8. A new composition of matter, comprising hydrochloric acid and the condensation product derived from one mole of a higher molecular weight carboxy acid, at least one mole of an alkylolamine, and at least one mole of an amine, said hydrochloric acid in uncombined form being present on a large molal excess basis in comparison with the condensation product.

9. A new composition of matter, comprising hydrochloric acid and the condensation product obtained by reacting one mole of a higher molecular weight carboxy acid with at least one mole of an alkylolamine and at least one mole of an amine at a temperature between 100° and 300° C., said hydrochloric acid in uncombined form being present on a large molal excess basis in comparison with the condensation product.

10. A new composition of matter, comprising a strong mineral acid and the condensation product obtained by reacting one mole of a fatty acid having at least 8 carbon atoms and not more than 32 carbon atoms, with at least one mole of an alkylolamine and at least one mole of an amine at a temperature between 100° and 300° C., said mineral acid in uncombined form being present on a large molal excess basis in comparison with the condensation product.

11. A new composition of matter, comprising a strong mineral acid and the condensation product obtained by reacting one mole of an unsaturated fatty acid having at least 8 carbon atoms and not more than 32 carbon atoms, with at least one mole of an alkylolamine and at least one mole of an amine at a temperature between 100° and 300° C., said mineral acid in uncombined form being present on a large molal excess basis in comparison with the condensation product.

12. A new composition of matter, comprising a strong mineral acid and the condensation product obtained by reacting one mole of ricinoleic acid with at least one mole of an alkylolamine and at least one mole of an amine at a temperature between 100° and 300° C., said mineral acid in uncombined form being present on a large molal excess basis in comparison with the condensation product.

13. A new composition of matter, comprising a strong mineral acid and the condensation product obtained by reacting one mole of ricinoleic acid with at least one mole of an ethanolamine and at least one mole of an amine at a temperature between 100° and 300° C., said mineral acid in uncombined form being present on a large molal excess basis in comparison with the condensation product.

MELVIN DE GROOTE.